US009423843B2

(12) United States Patent
Garnier et al.

(10) Patent No.: US 9,423,843 B2
(45) Date of Patent: Aug. 23, 2016

(54) PROCESSOR MAINTAINING RESET-STATE AFTER RESET SIGNAL IS SUSPENDED

(71) Applicant: Atmel Corporation, San Jose, CA (US)

(72) Inventors: Sylvain Garnier, Nantes (FR); Anthony Rouaux, Mauves sur Loire (FR); Sebastien Jouin, La Chapelle-Launay (FR); Frode Milch Pedersen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 320 days.

(21) Appl. No.: 13/624,651

(22) Filed: Sep. 21, 2012

(65) Prior Publication Data
US 2014/0089648 A1    Mar. 27, 2014

(51) Int. Cl.
*G06F 1/24*        (2006.01)
*G06F 11/267*    (2006.01)

(52) U.S. Cl.
CPC ............ *G06F 1/24* (2013.01); *G06F 11/267* (2013.01)

(58) Field of Classification Search
CPC .............. G06F 11/267; G06F 11/3636; G06F 11/3648; G06F 11/00; G06F 11/25; G06F 11/26; G06F 11/3656; G01R 31/28
USPC .......................................................... 713/1
See application file for complete search history.

(56) References Cited

U.S. PATENT DOCUMENTS

| | | | | |
|---|---|---|---|---|
| 4,502,116 A * | 2/1985 | Fowler et al. | | 714/4.3 |
| 4,647,862 A * | 3/1987 | Blair | | H03K 3/023 327/172 |
| 5,825,708 A * | 10/1998 | Bennett | | G06F 3/0614 365/226 |
| 5,983,367 A * | 11/1999 | Higuchi et al. | | 714/42 |
| 6,779,145 B1 * | 8/2004 | Edwards et al. | | 714/733 |
| 6,845,412 B1 * | 1/2005 | Boike et al. | | 710/36 |
| 2002/0026612 A1 * | 2/2002 | Osawa | | G01R 31/318552 714/726 |
| 2002/0038439 A1 * | 3/2002 | Sato | | G01R 31/31813 714/724 |
| 2003/0056154 A1 * | 3/2003 | Edwards et al. | | 714/45 |
| 2003/0141909 A1 * | 7/2003 | Iwaguro | | H03K 5/1534 327/142 |
| 2004/0228400 A1 * | 11/2004 | Tanaka | | H04L 25/4904 375/239 |
| 2006/0181325 A1 * | 8/2006 | James | | G01R 31/31727 327/291 |
| 2006/0259753 A1 * | 11/2006 | Lell et al. | | 713/1 |
| 2007/0168775 A1 * | 7/2007 | Tikotkar et al. | | 714/718 |
| 2007/0220337 A1 * | 9/2007 | Itoh et al. | | 714/30 |
| 2008/0098205 A1 * | 4/2008 | Dolve et al. | | 712/220 |
| 2009/0106609 A1 * | 4/2009 | Sato | | 714/726 |
| 2009/0288160 A1 * | 11/2009 | Esliger et al. | | 726/17 |
| 2010/0138640 A1 * | 6/2010 | Gilday et al. | | 713/1 |
| 2012/0151264 A1 * | 6/2012 | Balkan et al. | | 714/34 |

FOREIGN PATENT DOCUMENTS

WO    WO2012087330 A2 *    6/2012 ............. G06F 11/00

* cited by examiner

*Primary Examiner* — Thomas Lee
*Assistant Examiner* — Santosh R Poudel
(74) *Attorney, Agent, or Firm* — Fish & Richardson, P.C.

(57) ABSTRACT

Systems and techniques for processor reset hold control are described. A described system includes a controller to detect a hold request based on an external reset signal and an external debug signal, and generate a hold signal based on a detection of the hold request, where the hold signal continues after the external reset signal has been discontinued; a system component that is responsive to the external reset signal; a processor that is responsive to the hold signal, where the hold signal causes the processor to enter a reset state and to maintain the reset state after the external reset signal has been discontinued; and a system manager configured to permit external access to the system component while the processor is in the reset state. The controller can be configured to discontinue the hold signal in response to a clear request.

21 Claims, 5 Drawing Sheets

PROCESSOR MAINTAINING RESET-STATE AFTER RESET SIGNAL IS SUSPENDED

TECHNICAL FIELD

This patent document relates generally to processor reset hold control hardware architectures.

BACKGROUND

Device developers may use hardware debuggers to program and/or debug a device. A hardware debugger can use a Joint Test Action Group (JTAG) based interface to gain control of a processor. A debugging application, running on a host device, can connect with the hardware debugger to perform operations such as setting software breakpoints, monitoring processor states, reading data, or writing data to one or more locations.

SUMMARY

This document describes, among other things, technologies relating to bifurcated processor-chip reset control architectures. In one aspect, a described system includes a pad interface(s) configured to receive signals including an external debug signal and an external reset signal; a controller to detect a hold request based on the external reset signal and the external debug signal, and generate a hold signal based on a detection of the hold request, where the hold signal continues after the external reset signal has been discontinued; a system component that is responsive to the external reset signal; a processor that is responsive to the hold signal, where the hold signal causes the processor to enter a reset state and to maintain the reset state after the external reset signal has been discontinued; and a system manager communicatively coupled with the controller and the system component, and configured to permit external access to the system component while the processor is in the reset state. The system manager can be configured to send a clear request to the controller to clear the hold request. The controller can be configured to discontinue the hold signal in response to the clear request. The processor can be configured to transition from the reset state to an active state based on a discontinuation of the hold signal.

This and other implementations can include one or more of the following features. The system component can include a non-volatile memory. The system manager can be configured to control a programming of the non-volatile memory while the processor is in the reset state. The system manager can be configured to generate the clear request based on a completion of the programming of the non-volatile memory. The controller can include one or more flip-flops to register the hold request once per a detection of the hold request. The clear request can reset the one or more flip-flops such that the controller discontinues the hold signal. The system manager can be configured to receive an external clear request and to generate the clear request based on the external clear request. The system manager can include a debug system. Implementations can include a clock system that provides a clock signal to the controller.

A processor-chip, such as an integrated circuit device, can include a first pad interface configured to receive an external debug signal; a second pad interface configured to receive an external reset signal; a controller to detect a hold request based on the external reset signal and the external debug signal, and generate a hold signal based on a detection of the hold request; a system component that is responsive to the external reset signal; a processor that is responsive to the external reset signal and the hold signal, where the external reset signal causes the processor to enter a reset state, and where the hold signal causes the processor to maintain the reset state after the external reset signal has been discontinued; and a system manager communicatively coupled with the controller and the system component, and configured to permit external access to the system component while the processor is in the reset state. The system manager can be configured to send a clear request to the controller to clear the hold request. The controller can be configured to discontinue the hold signal in response to the clear request. The processor can be configured to transition from the reset state to an active state based on a discontinuation of the hold signal.

A bifurcated processor-chip reset control technique can include receiving signals that include an external debug signal and an external reset signal; detecting a hold request based on the external reset signal and the external debug signal; generating a hold signal based on a detection of the hold request, where the hold signal continues after the external reset signal has been discontinued; operating one or more system components based on the external reset signal; operating a processor based on the hold signal, where the hold signal causes the processor to enter a reset state and to maintain the reset state after the external reset signal has been discontinued; providing external access to the one or more system components while the processor is in the reset state; and generating a clear request to discontinue the hold signal to cause the processor to transition from the reset state to an active state.

Particular embodiments of the technology described in this document can be implemented so as to realize one or more of the following advantages. One or more described technologies can be used to ensure stable performance of a processor system, whatever the initial conditions are, by freezing, for a configurable period of time, the processor in an initial state immediately after releasing the external reset such that other components such as a non-volatile memory can be accessed. Fetching and executing code from an non-volatile memory that is in the middle of programming may cause erroneous system behavior including a system deadlock. Accordingly, such freezing can prevent a processor from fetching and executing code from an non-volatile memory that is being programmed or is not yet in a stable state.

The details of one or more embodiments of the subject matter described in this document are set forth in the accompanying drawings and the description below. Other features, aspects, and advantages of the subject matter will become apparent from the description, the drawings, and the claims.

DETAILED DESCRIPTION

Figure 1:
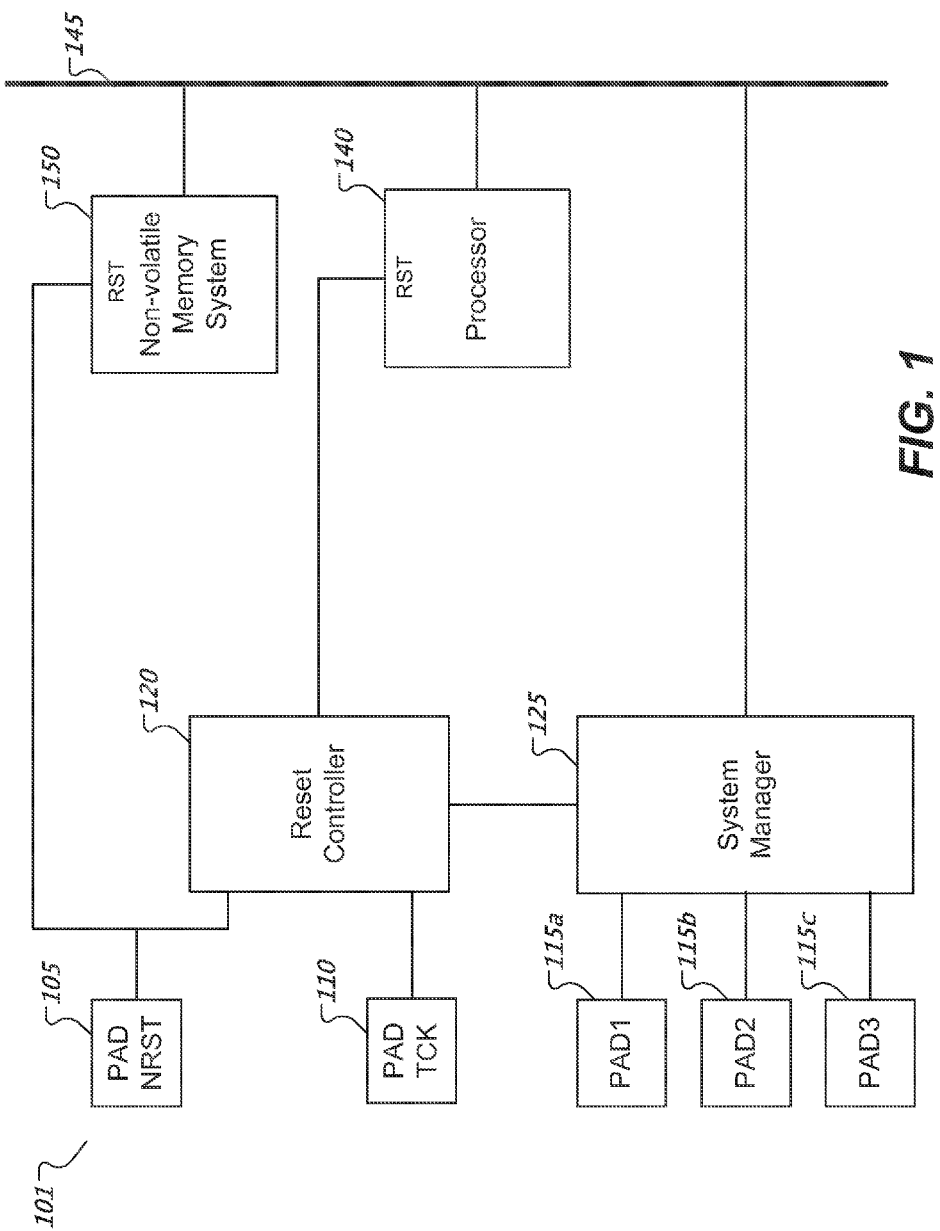
FIG. 1 shows a simplified schematic diagram of an example architecture of an integrated circuit device that includes reset hold control circuitry.

FIG. 1 shows a simplified schematic diagram of an example architecture of an integrated circuit device 101 that includes reset hold control circuitry. The device 101 includes a bifurcated processor chip reset mechanism in which parts of the device 101 are allowed to start-up sooner than other parts of the device 101 after an external reset event. The integrated circuit device 101 includes a debug pad interface 110 (labeled as PAD TCK), a reset pad interface 105 (labeled as PAD NRST), one or more communication pad interfaces 115a-c (labeled as PAD1, PAD2, and PAD3 respectively), a reset controller 120, a system manager 125, a processor 140, and a non-volatile memory system 150. The integrated circuit device 101 can be referred to as a processor chip. In some implementations, the integrated circuit device 101 is a microcontroller. In some implementations, the integrated circuit device 101 includes multiple processor cores.

The processor 140 can be communicatively coupled with various components such as the system manager 125 and the non-volatile memory system 150 via a bus 145. The system manager 125 can be communicatively coupled with the communication pad interfaces 115a-c. The non-volatile memory 150 can be configured to store firmware for execution on the processor 140. In some implementations, the non-volatile memory system 150 can be programmed via one or more of the communication pad interfaces 115a-c.

The reset pad interface 105 can be used to reset the integrated circuit device 101. For example, a reset signal received via the reset pad interface 105 can reset system components including the processor 140 and the non-volatile memory system 150. The non-volatile memory system 150 can include a memory controller and a non-volatile memory structure such as a flash memory structure. Other types of non-volatile memory structures are possible. Once the reset signal ceases, the integrated circuit device 101 can start-up. The reset controller 120 can be configured to delay a start-up of the processor 140 with respect to other system components such as the non-volatile memory system 150. For example, while the processor 140 is in a hold-reset state, the non-volatile memory system 150 can be programmed. In some implementations, the hold-reset state is a reset state, an inactive processor state, or a combination thereof.

In some implementations, a combination of waveforms on the debug pad interface 110 and the reset pad interface 105 can signal a processor reset hold request to the reset controller 120. This combination includes a reset signal on the reset pad interface 105 which places the integrated circuit device 101 in a reset mode. Based on a detection of a processor reset hold request, the reset controller 120 generates a hold signal that will continue after the reset signal ceases. The hold signal will keep the processor 140 in a hold-reset state.

In some implementations, the reset controller 120 clears the hold signal based on a predetermined amount of time. In some implementations, the reset controller 130 clears the hold signal based on a clear request generated by the system manager 125. For example, after a programming of the non-volatile memory system 150 is completed, the system manager 125 can generate a clear request. In some implementations, a clear request can be initiated by a command sequence that writes to one or more control registers associated with the system manager 125.

The system manager 125, in some implementations, can include a debug system. In some implementations, a debug system can be used to program the non-volatile memory system 150. A debug probe (not shown) can be attached to the integrated circuit device 101. Attaching a debug probe can include plugging a debug probe into a debug port that is interconnected with the device 101. In some implementations, the debug probe is based on the JTAG standard. The debug probe can include multiple interfaces including a debug clock signal interface that provides a clock signal. Further, the debug probe can include one or more communication interfaces that provide read/write access with the device 101, including among other things the processor 140 and the non-volatile memory system 150, via the debug system. When attached and after an external reset is released, the probe's clock interface becomes coupled with the debug pad interface 110, e.g., a debug clock pad interface, and the probe's one or more communication interfaces become coupled with the one or more communication pad interfaces 115a-c. In some implementations, an internal clock system (not shown) within the integrated circuit device 101 can be configured to synchronize with the clock signal provided by the debug probe via the debug pad interface 110.

Figure 2:
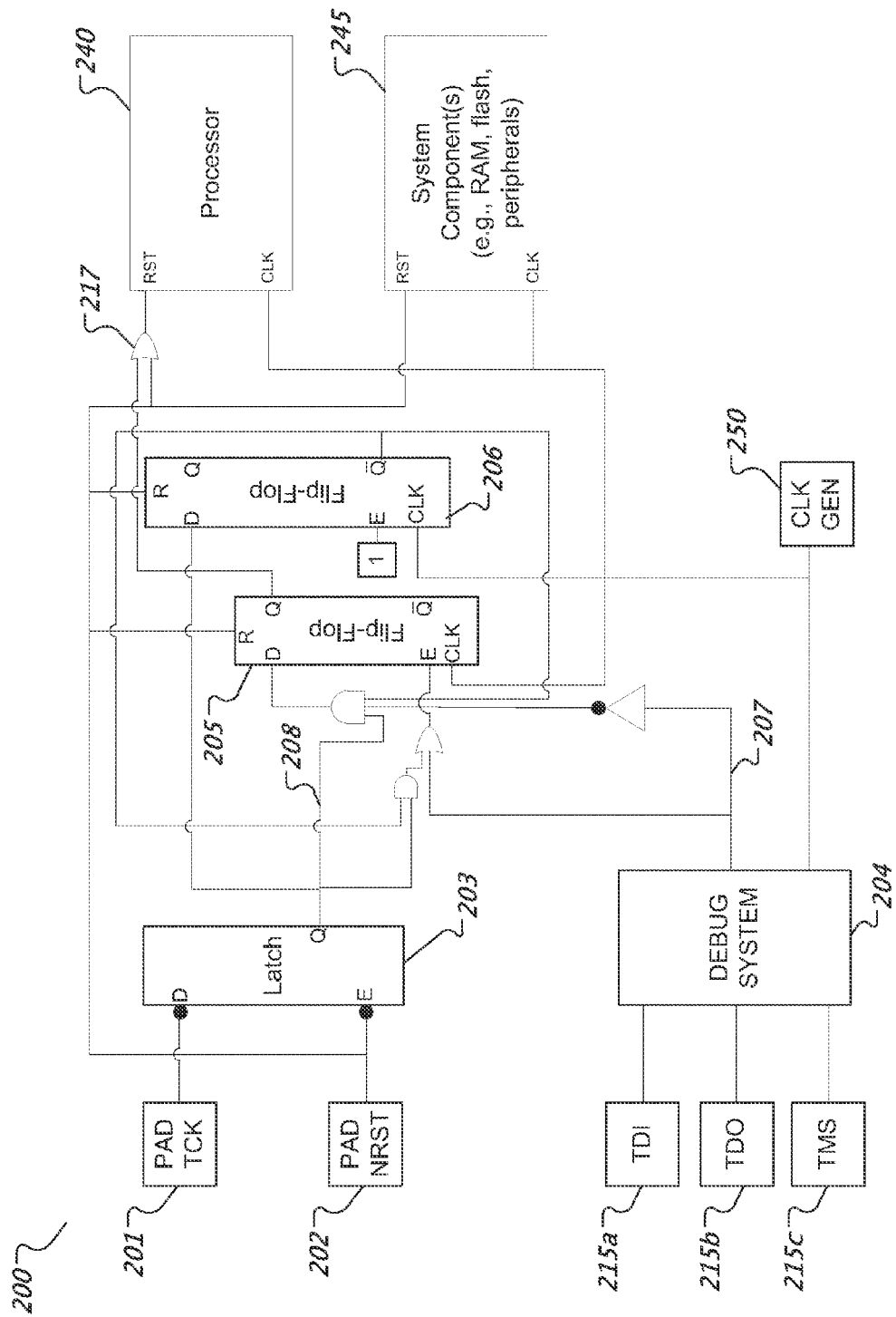
FIG. 2 shows a simplified schematic diagram of another example architecture of an integrated circuit device that includes reset hold control circuitry.

FIG. 2 shows a simplified schematic diagram of another example architecture of an integrated circuit device 200 that includes reset hold control circuitry. The integrated circuit device 200 includes a debug pad interface 201 (labeled as PAD TCK), a reset pad interface 202 (labeled as PAD NRST), debug communication pad interfaces 215a-c (labeled as TDI, TDO, and TMS respectively), a debug system 204, a processor 240, one or more system components 245, and a clock generator 250. The debug communication pad interfaces can include a debug data in pad interface 215a (labeled as TDI), a debug data out pad interface 215b (labeled as TDO), and a debug mode select pad interface 215c (labeled as TMS). In some implementations, multiple debug communication pad interfaces can be multiplexed onto a single debug communication pad interface. Reset hold control circuitry of the integrated circuit device 200 includes a latch 203, flip-flops 205, 206, and other logic as depicted by FIG. 2. The clock generator 250 can provide an internal clock signal to various system components include component(s) 245, processor 240, and the flip-flops 205, 206 of the reset hold control circuitry.

The integrated circuit device 200 can use a reset tree to reset the whole device 200 and then keep just the processor 240 in a reset hold until a later time. The reset tree can include an internal reset signal distributed to the latch 203, flip-flops 205, 206, OR gate 217, and system component(s) 245. The internal reset signal can be triggered by an external reset signal that is received via the reset pad interface 202. In some implementations, circuitry coupled with the reset pad interface 202 can combine an external reset signal that is received via the reset pad interface 202 and an internal signal such as a power on reset (POR) signal and/or a brown-out detector (BOD) signal to produce an internal reset signal that is distributed on the reset tree. The integrated circuit device 200 can be configured to detect reset signaling via the debug pad interface 201 and the reset pad interface 202, and once detected, place the processor 240 in a hold-reset state after an external reset.

When asserting an external reset via the reset pad interface 202, the latch 203 is in a transparent state and samples the debug pad interface 201. If debug pad interface 201 is low while the external reset is de-asserted, then a processor reset hold request 208 is generated and provided to other parts of the reset hold control circuitry. The processor reset hold request 208 is registered by the flip-flops 205, 206. In some implementations, the flip-flops 205, 206 are configured to ensure that a hardware set request can be registered only once after an external reset is asserted and cleared by a debug component clear request 207. Registering a processor reset hold request 208 when the external reset is active can potentially avoid a requirement for having a resynchronization mechanism between the latch 203 and the flip-flops 205, 206.

In some implementations, the flip-flops 205, 206 can be a D-type flip-flop that includes a data "D" input, a clock input, an enable "E" input, a reset input, a Q output, and negated Q output (Q-bar). Other types of flip-flops are possible. Note that a static logic one is provided to the "E" input of flip-flop 206. The processor reset hold request 208 is further provided to the "D" input of flip-flop 206, which is configured to register a hold reset request once per reset. The Q output of flip-flop 205 provides a hold signal. An OR gate 217 combines the hold signal with the reset signal received via the reset pad interface 202. Providing the processor 240 with a combined hold signal and reset signal allows the processor 240 to be kept in a reset state longer than other components 245 that are controlled by the reset signal. The combined hold signal and reset signal can be referred to as simply a hold signal.

A clear request such as a debug component clear request 207 can be initiated by the debug system 204. In some implementations, writing to a predetermined memory address via one of the debug communication pad interfaces 215a-c can cause the debug system 204 to initiate the clear request 207. The clear request 207 will cause flip-flop 205 to clear its Q output, which allows the processor 240 to transition into an active state and to being interacting with the system components 245. In some implementations, the debug system 204 can be synchronous with the clock generator 250. In some implementations, a clear request can be a pulse generated in a clock domain associated with the clock generator 250.

Figure 3:
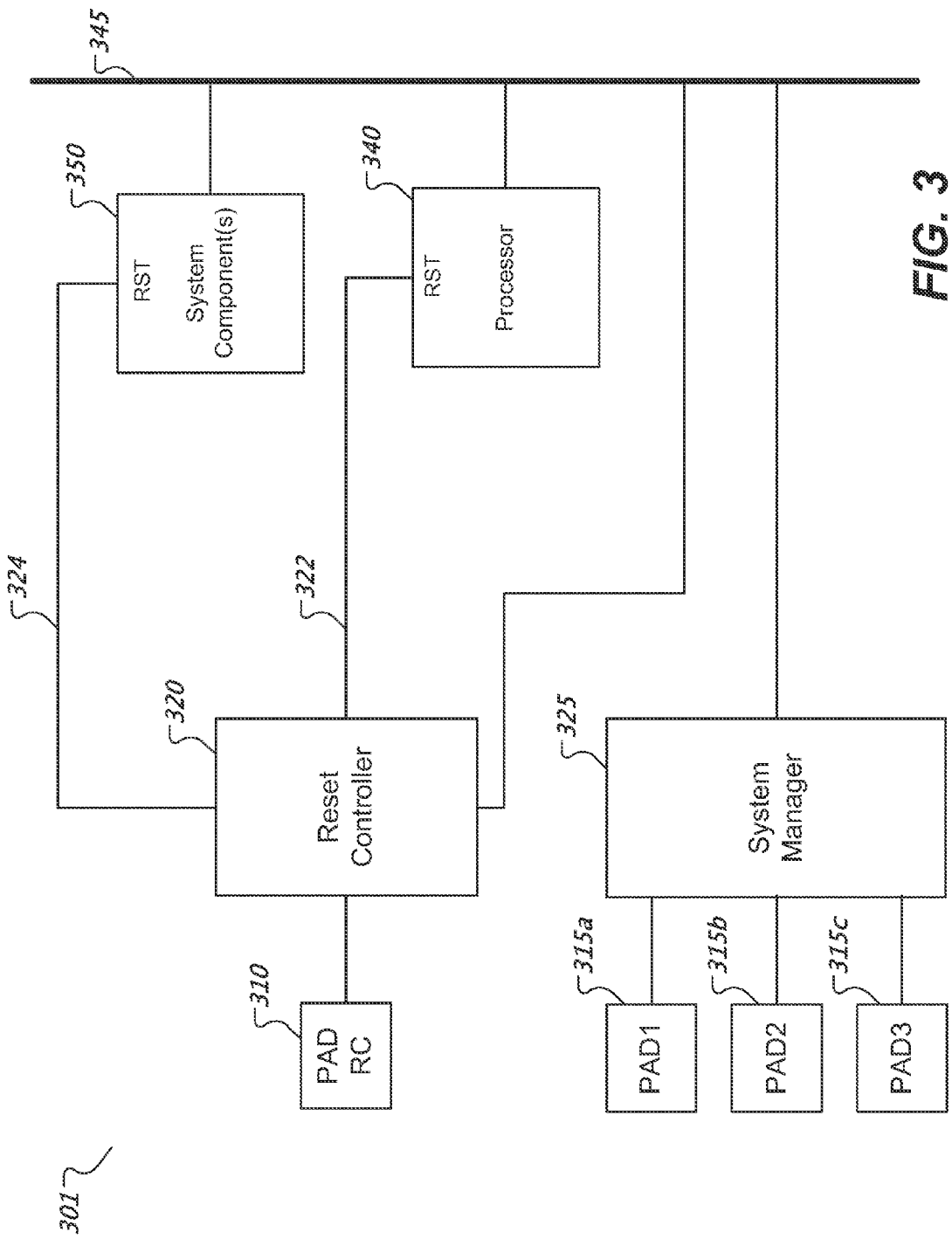
FIG. 3 shows a simplified schematic diagram of another example architecture of a processor system that includes reset hold control circuitry.

FIG. 3 shows a simplified schematic diagram of another example architecture of a processor system 301 that includes reset hold control circuitry. The integrated circuit device 301 includes a RC pad interface 310 (labeled as PAD RC), one or more communication pad interfaces 315a-c (labeled as PAD1, PAD2, and PAD3 respectively), a reset controller 320, a system manager 325, a processor 340, and one or more system components 350.

The processor 340 can be communicatively coupled with various components such as the reset controller 320, system manager 325, and system components 350 via a bus 345. The system manager 325 can be communicatively coupled with the communication pad interfaces 315a-c. In some implementations, one or more of the system components 350 can be programmed via one or more of the communication pad interfaces 315a-c.

The RC pad interface 310 can be used to reset the integrated circuit device 301. For example, a reset signal received via the RC pad interface 310 can reset system components including the processor 340 and the system components 350. Once the reset signal ceases, the integrated circuit device 301 can start-up. The reset controller 320 can be configured to delay a start-up of the processor 340 with respect to other components such as the system components 350. For example, while the processor 340 is in a hold-reset state, the system components 350 can accessed via the communication pad interfaces 315a-c.

In some implementations, a known waveform on the RC pad interface 310 can signal a processor reset hold request to the reset controller 320 in addition to signal a system-wide reset. In some implementations, the RC pad interface 310 includes two or more interfaces, and a combination of signals received on said interfaces triggers the processor reset hold request. Based on a detection of a processor reset hold request, the reset controller 320 generates an internal reset signal 324 and a hold signal 322 that will continue after the internal reset signal 324 ceases. The reset controller 320 uses the internal reset signal 324 to reset the system components 350, whereas the reset controller 320 uses the hold signal 322 to reset and keep the processor 340 in a hold-reset state for a period of time after it de-asserts the internal reset signal 324. In some implementations, the reset controller 320 clears the hold signal 322 based on a predetermined amount of time that is determined by a timer. In some implementations, the reset controller 320 clears the hold signal based on a clear request received via the bus 345. In some implementations, the system manager 325 generates a clear request.

Figure 4:
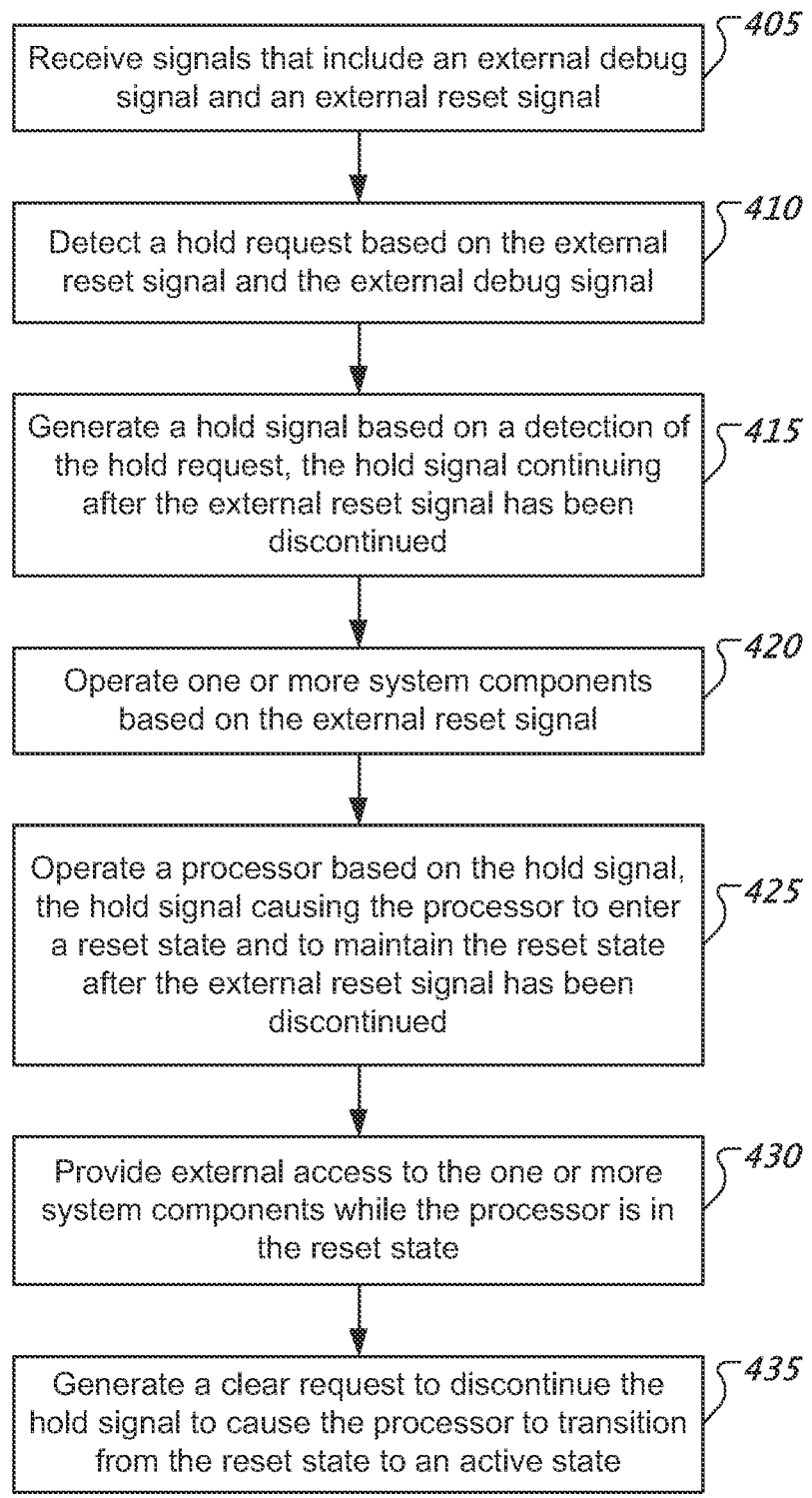
FIG. 4 shows a flowchart of an example of a processor reset hold control process.

FIG. 4 shows a flowchart of an example of a processor reset hold control process. At 405, the process receives signals that include an external debug signal and an external reset signal. At 410, the process detects a hold request based on the external reset signal and the external debug signal. Detecting a hold request can include detecting a first waveform on a reset pad interface associated with an external reset and detecting a second waveform on a debug pad interface associated with the external debug signal. Detecting a waveform can include sensing a raising edge or a failing edge. In some implementations, the process registers the hold request. At 415, the process generates a hold signal based on a detection of the hold request, the hold signal continuing after the external reset signal has been discontinued.

At 420, the process operates one or more system components based on the external reset signal. Operating the one or more system components can include resetting the components based on the external reset signal. The one or more system components can include one or more memory systems, one or more internal peripheral components, or a combination thereof. Other types of system components are possible. A memory system can include a memory controller and a memory structure such as a non-volatile memory, random access memory (RAM), or read-only memory (ROM). At 425, the process operates a processor based on the hold signal. The hold signal causes the processor to enter a reset state and to maintain the reset state after the external reset signal has been discontinued.

At 430, the process provides external access to the one or more system components while the processor is in the reset state. Providing external access can include interfacing one or more communication pad interfaces with a bus that is communicatively coupled with the processor and the one or more system components. Providing external access can include programming the non-volatile memory while the processor is in the reset state. Providing external access can include providing access to a debug system. At 435, the process generates a clear request to discontinue the hold signal to cause the processor to transition from the reset state to an active state. Generating the clear request can include generating the clear request based on a completion of the programming of the non-volatile memory.

Figure 5:
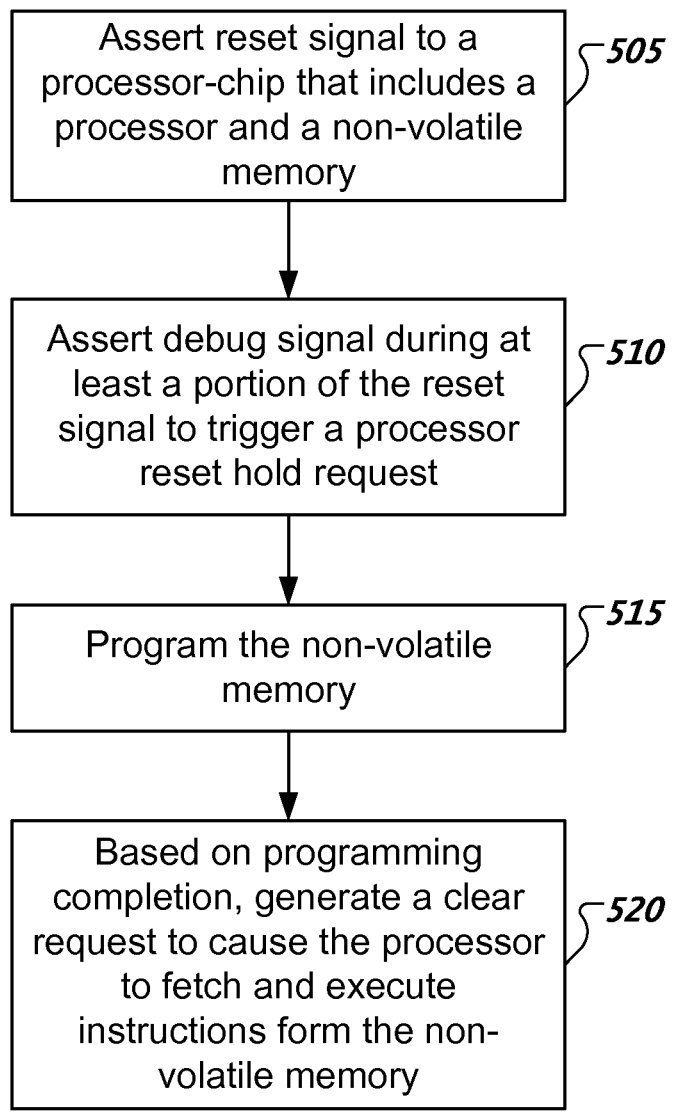
FIG. 5 shows a flowchart of an example process of programming a processor chip with a processor reset hold capability.

FIG. 5 shows a flowchart of an example process of programming a processor chip with a processor reset hold capability. At 505, the process asserts a reset signal to a processor-chip that includes a processor and a non-volatile memory. At 510, the process asserts a debug signal during at least a portion of the reset signal to trigger a processor reset hold request. At 515, the process programs the non-volatile memory. At 520, the process, based on programming completion, generates a clear request to cause the processor to fetch and execute instructions form the non-volatile memory.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An integrated circuit apparatus comprising:
    a first pad interface configured to receive an external debug signal;
    a second pad interface configured to receive an external reset signal;
    a controller configured to detect a hold request based on a combination of a first waveform associated with the external debug signal received at the first pad interface and a second waveform associated with the external reset signal received at the second pad interface, and to generate a hold signal and an internal reset signal based on a detection of the hold request;
    a processor that is responsive to the external reset signal and the hold signal, wherein the external reset signal causes the processor to enter a reset state, wherein the hold signal causes the processor to maintain the reset state after the external reset signal has been discontinued, and wherein the generated internal reset signal is used by the controller to reset a system component; and
    a system manager communicatively coupled with the controller and the system component, and configured to permit external access to the system component while the processor is in the reset state,
    wherein the system manager is configured to send a clear request to the controller to clear the hold request, wherein the controller is configured to discontinue the hold signal in response to the clear request, and wherein the processor is configured to transition from the reset state to an active state based on a discontinuation of the hold signal.

2. The apparatus of claim 1, wherein the system component includes a non-volatile memory, and wherein the system manager is configured to control a programming of the non-volatile memory while the processor is in the reset state.

3. The apparatus of claim 2, wherein the system manager is configured to generate the clear request based on a completion of the programming of the non-volatile memory.

4. The apparatus of claim 1, wherein the controller comprises one or more flip-flops to register the hold request once per a detection of the hold request, and wherein the clear request resets the one or more flip-flops such that the controller discontinues the hold signal.

5. The apparatus of claim 1, wherein the system manager is configured to receive an external clear request and to generate the clear request based on the external clear request.

6. The apparatus of claim 1, wherein the system manager includes a debug system.

7. The apparatus of claim 1, further comprising:
    a clock system that provides a clock signal to the controller.

8. The apparatus of claim 1, wherein the controller is configured to combine the hold signal and the external reset signal to obtain a combined hold signal and reset signal and to provide the combined hold signal and reset signal to the processor, and
    wherein the combined hold signal and reset signal causes the processor to enter the reset state when the external reset signal causes the system component to enter the reset state, and to maintain the reset state after the external reset signal has been discontinued.

9. The apparatus of claim 1, further comprising circuitry coupled to the second pad interface and configured to combine the external reset signal and an internal signal to produce the internal reset signal,
    wherein the internal signal comprises at least one of a power on reset signal or a brown-out detector signal.

10. The apparatus of claim 1, wherein the controller is configured to detect the second waveform associated with the external reset signal by sensing a raising edge or a failing edge received at the second pad interface.

11. A system comprising:
    a plurality of pad interfaces configured to receive signals including an external debug signal and an external reset signal;
    a controller configured to detect a hold request based on a combination of a first waveform associated with the external debug signal and a second waveform associated with the external reset signal at the pad interfaces, and to generate a hold signal and an internal reset signal based on a detection of the hold request, wherein the hold signal continues after the internal reset signal has been discontinued;
    a processor that is responsive to the hold signal, wherein the hold signal causes the processor to enter a reset state and to maintain the reset state after the internal reset signal has been discontinued, and wherein the generated internal reset signal is used by the controller to reset a system component; and
    a system manager communicatively coupled with the controller and the system component, and configured to permit external access to the system component while the processor is in the reset state,
    wherein the system manager is configured to send a clear request to the controller to clear the hold request, wherein the controller is configured to discontinue the hold signal in response to the clear request, and wherein the processor is configured to transition from the reset state to an active state based on a discontinuation of the hold signal.

12. The system of claim 11, wherein the system component includes a non-volatile memory, and wherein the system manager is configured to control a programming of the non-volatile memory while the processor is in the reset state.

13. The system of claim 12, wherein the system manager is configured to generate the clear request based on a completion of the programming of the non-volatile memory.

14. The system of claim 11, wherein the controller comprises one or more flip-flops to register the hold request once per a detection of the hold request, and wherein the clear request resets the one or more flip-flops such that the controller discontinues the hold signal.

15. The system of claim 11, wherein the system manager is configured to receive an external clear request and to generate the clear request based on the external clear request.

16. The system of claim 11, wherein the system manager includes a debug system.

17. The system of claim 11, further comprising:
    a clock system that provides a clock signal to the controller.

18. A method comprising:
    receiving signals that include an external debug signal and an external reset signal;

detecting a hold request based on a combination of a first waveform associated with the external debug signal received at a first pad interface and a second waveform associated with the external rest signal received at a second pad interface;

generating a hold signal and an internal reset signal based on a detection of the hold request, wherein the hold signal continues after the external reset signal has been discontinued;

operating one or more system components based on the generated internal reset signal by resetting the one or more system components using the generated internal reset signal;

operating a processor based on the hold signal, wherein the hold signal causes the processor to enter a reset state and to maintain the reset state after the external reset signal has been discontinued;

providing external access to the one or more system components while the processor is in the reset state; and generating a clear request to discontinue the hold signal to cause the processor to transition from the reset state to an active state.

19. The method of claim 18, wherein the one or more system component includes a non-volatile memory, and wherein providing external access comprises programming the non-volatile memory while the processor is in the reset state.

20. The method of claim 19, wherein generating the clear request comprises generating the clear request based on a completion of the programming of the non-volatile memory.

21. The method of claim 18, further comprising:

registering the hold request once per a detection of the hold request.

\* \* \* \* \*